Figure 1:
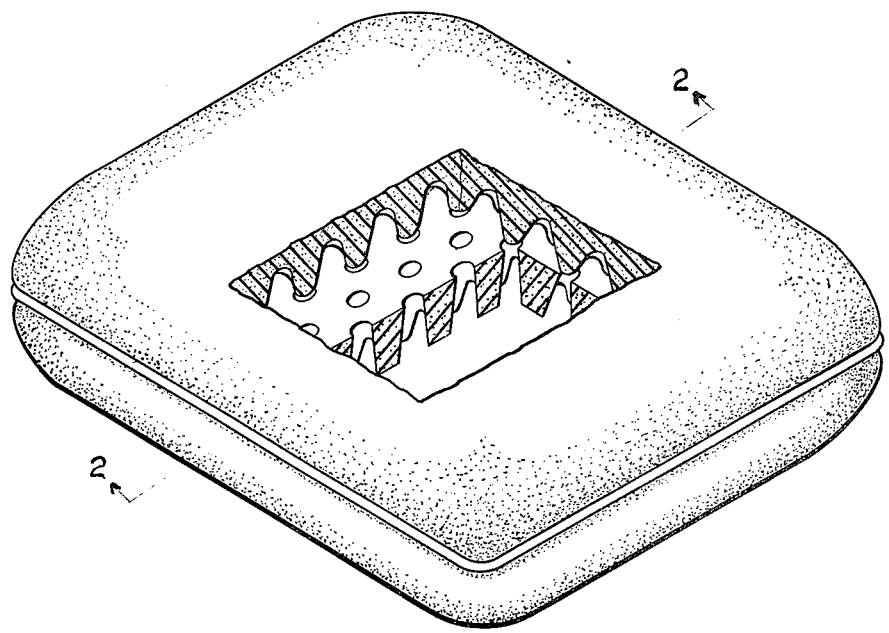

Sept. 14, 1965   L. UNGER   3,205,515

COMPOSITE CUSHIONS OF CELLULAR MATERIAL

Filed Jan. 14, 1963

INVENTOR.
Leo Unger
BY William B. Jaspert
Attorney.

United States Patent Office 3,205,515
Patented Sept. 14, 1965

3,205,515
COMPOSITE CUSHIONS OF CELLULAR MATERIAL
Leo Unger, 5948 Phillips Ave., Pittsburgh 17, Pa.
Filed Jan. 14, 1963, Ser. No. 251,302
2 Claims. (Cl. 5—361)

This invention relates to new and useful improvements in cushioning material, more particularly of the so-called foam rubber type generally designated "foamed elastomers" and it is among the objects thereof to provide suitable cushioning material from foamed rubber or synthetic products by utilizing a composite structure made up of superposed layers of cushioning material in which the juxtaposed faces of the layers are shaped to normally maintain the foam of the cushion yet be readily collapsible to provide a resilient cushion action when the layers are put under compression.

It is a further object of the invention to provide a cushioning material of superposed layers of foamed material whereby the cushioning properties of the material itself are augmented by shaping the inner faces of the outer layers and the faces of the intermediate layers in a manner to render the material more flexible and yet provide self-sustaining properties, when the cushion is in normal non-use position.

It is still a further object of the invention to provide such cushioning structures for a plain surface median layer that constitutes a support for the adjacent layers to maintain alignment of said last-named layers while providing maximum flexibility of the composite structure.

Figure 2:
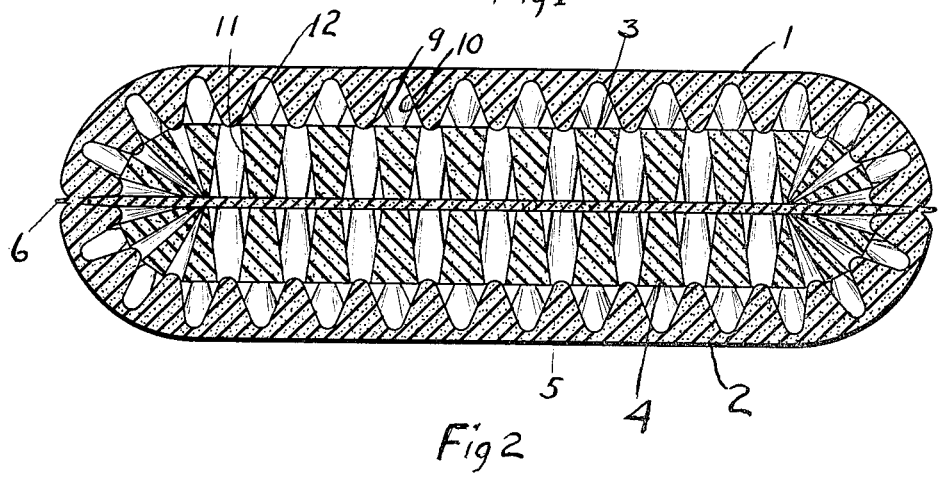

The invention will become more apparent from a consideration of the accompanying drawing constituting a part hereof in which like reference characters designate like parts and in which:

FIGURE 1 is an isometric view, partially cut away, of a foam rubber or other cellular resilient elastic material embodying the principles of this invention; and, FIGURE 2 is a cross-sectional view taken along the line 2—2 of FIGURE 1.

In the drawing, the numerals 1 and 2 designate outer layers of cellular resilient elastomeric material, the numerals 3 and 4 intermediate layers of such material and the numeral 5 a median or central layer of a similar material in which the outer layers 1 and 2 are joined with the median central layer 5 by heat sealing as at 6, the cushion shape being given the material by the mold or jig in which they are held while being heat sealed.

In accordance with the present invention, intermediate layers of such cellular resilient material designated by the numerals 3 and 4 are disposed between the median layer 5 and the outer layers 1 and 2, these intermediate layers serving the function of providing a maximum space between the outer faces of the outer layers 1 and 2 and the central or median layer 5, such spaces allowing for displacement or expansion of the cellular resilient material which is especially shaped to normally resist distortion to constitute the cushion a self-sustaining structure while at the same time adding resilience to the natural resilience of the cellular resilient material by providing spaces in which the material may be displaced.

The material may be said to be cored and the manner in which it is cored to some degree varies the cushioning or resilient properties of the foam material.

As seen in FIGURE 1, the outer layers 1 and 2 are cored out to form a plurality of pyramidal or conical-shaped projections 9 with similar shaped spaces 10 therebetween. The intermediate sections are cut out to form frusto-conical shaped sections 11 with similar frusto-conical shaped spaces therebetween. The outer and intermediate sections are assembled so that the conical shaped members 9 of the outer layers are in alignment with the small opening 12 of the intermediate sections 3 and 4. The median layer 5 having plain surfaces act to support the intermediate layers 3 and 4 so that they cannot be displaced into the openings of the adjacent intermediate layer as would be the case if the median layer 5 were not disposed therebetween.

Because of the resilient properties of the outer layers 1 and 2 and the intermediate layers 3 and 4, the projections 9 will not interlock with the frusto-conical spaces and when the pressure is released from the cushion, they will be restored to the shape and relationship of projections and spaces as shown in FIGURE 2 of the drawing.

It will be readily understood that because of the alignment of the pyramidal projections 9 with the frusto-conical spaces 12 of the intermediate layers, the cushion can be readily flexed because, in addition to the normal resilience of the cellular material itself, the projections 9 will be displaced into the frusto-conical spaces 12 and allow the cushion to give more freely. At the same time, the resistance of the frusto-conical shaped solid portions 11 of the intermediate layers will prevent the conical elements 9 from being completely displaced in the recesses 12. Also, the resilience of the solid portions of the intermediate layers will, together with the resilience of the material in the outer layers, retract the conical projection portions 9 from the frusto-conical spaces 12 to restore the cushion to the normal position, as viewed in FIGURES 1 and 2.

The coring of the layers of the resilient material is effected by cutting elements in special machinery which is no part of the present invention.

Although one embodiment of the invention has been herein illustrated and described, it will be obvious to those skilled in the art that various modifications may be made in the details of construction without departing from the principles herein set forth.

I claim:

1. A cushion of cellular resilient elastomeric material comprising a plurality of outer layers having inner faces cut out to form conical projections and spaces, a central layer and a plurality of intermediate layers of similar material disposed therebetween, said intermediate layers being cut out to form frusto-conical projections and spaces with the small end of the frusto-conical spaces in alignment with the tips of the conical projections of the outer layers, the outer and central layers being joined at their peripheral edges and the intermediate layers being loosely sandwiched between the outer and central layers.

2. A cushion as set forth in claim 1 in which the small end of the frusto-conical sections of the intermediate layers are supported by the plain faces of the central layer.

References Cited by the Examiner
UNITED STATES PATENTS

| | | | |
|---|---|---|---|
| 2,853,399 | 9/58 | Shoults | 5—361 X |
| 2,898,975 | 8/59 | Wagner | 5—361 X |
| 2,953,195 | 9/60 | Turck | 5—361 X |
| 3,047,282 | 7/62 | Hardy | 5—361 |

FRANK B. SHERRY, Primary Examiner.